United States Patent
Davis et al.

(10) Patent No.: US 8,036,722 B2
(45) Date of Patent: Oct. 11, 2011

(54) MOBILE COMMUNICATION DEVICE WITH DEDICATED SPEAKERPHONE MICROPHONE

(75) Inventors: Giles T. Davis, Mundelein, IL (US); Ian P. Lewis, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 56 days.

(21) Appl. No.: 11/555,739

(22) Filed: Nov. 2, 2006

(65) Prior Publication Data

US 2008/0108394 A1  May 8, 2008

(51) Int. Cl.
*H04M 1/00* (2006.01)
(52) U.S. Cl. ...................... 455/575.1; 379/430
(58) Field of Classification Search ................. 455/159.1
See application file for complete search history.

(56) References Cited

U.S. PATENT DOCUMENTS

| | | | |
|---|---|---|---|
| 5,588,041 A | 12/1996 | Meyer, Jr. et al. | |
| 6,567,677 B1 | 5/2003 | Sokoloff | |
| 6,675,027 B1 * | 1/2004 | Huang | 455/575.1 |
| 7,003,099 B1 | 2/2006 | Zhang et al. | |
| 7,088,828 B1 * | 8/2006 | Bradford et al. | 381/71.1 |
| 7,187,958 B2 * | 3/2007 | Nishijima et al. | 455/575.3 |
| 2004/0097274 A1 * | 5/2004 | Schlegel | 455/569.2 |
| 2004/0219957 A1 * | 11/2004 | Nishijima et al. | 455/575.3 |
| 2005/0069164 A1 | 3/2005 | Muthuswamy et al. | |
| 2005/0124396 A1 * | 6/2005 | Brems et al. | 455/575.4 |
| 2005/0221867 A1 | 10/2005 | Zurek et al. | |
| 2005/0281415 A1 | 12/2005 | Lambert et al. | |

FOREIGN PATENT DOCUMENTS

JP  2002-281135 A  9/2002

* cited by examiner

*Primary Examiner* — Dwayne Bost
*Assistant Examiner* — Joseph Dean, Jr.
(74) *Attorney, Agent, or Firm* — Hisashi D. Watanabe

(57) ABSTRACT

A mobile communication device having a first housing and a second housing proximally coupled to the first housing. The first housing and the second housing can be, for example, rotationally or translationally coupled. A clamshell form factor and a rotator form factor are rotationally coupled. In another example, a slider phone form factor is translationally coupled. In these examples, the devices are configured to have an open position and configured to have a closed position. A speakerphone microphone is located in the first housing. A speakerphone speaker is located in the second housing wherein the speakerphone microphone is substantially distal the speakerphone speaker.

14 Claims, 4 Drawing Sheets

MOBILE COMMUNICATION DEVICE WITH DEDICATED SPEAKERPHONE MICROPHONE

FIELD

Disclosed are mobile communication devices with speakerphones, and more particularly mobile communication devices with dedicated speakerphone microphones.

BACKGROUND

Mobile communication devices, such as cellular telephones can include speakerphones. The requirement for full-duplex communication in handsfree mode is fairly recent. Handsfree mode refers to the ability to carry on communication without the need to hold the mobile communication device in one's hand, for example, by use of a car kit or a mobile communication device equipped with a speakerphone. In full-duplex communication the transmission of data occurs in two directions simultaneously. A wireline telephone is a full-duplex device because both parties can talk at once. In contrast a walkie-talkie is a half-duplex device because only one party can transmit at a time. Until the requirement for full-duplex communication was made in mobile communication devices, and in particular cellular telephones, echo algorithms were capable of handling the inherent feedback between the speaker and the microphone in a mobile communication device that is not a full-duplex device.

A difficulty with full-duplex communication in handsfree mode is that the microphone is expected to pickup and transmit what the user is saying while at the same time the loudspeaker or speakerphone speaker is presenting speech. The signals from the speakerphone speaker can travel through air and can be picked up by the microphone as it transmits signals. Therefore when a speakerphone speaker and a microphone are within close proximity or are in the same housing, substantially perfect sealing and/or echo algorithms may not sufficiently reduce echo.

DETAILED DESCRIPTION

It would be beneficial if there were substantial mechanical isolation between the speakerphone speaker and the microphone to help avoid echo. Disclosed is a mobile communication device having a first housing and a second housing proximally coupled to the first housing. The first housing and the second housing can be, for example, rotationally or translationally coupled. A clamshell form factor and a rotator form factor are rotationally coupled. In another example, a slider phone form factor is translationally coupled. In these examples, the devices are configured to have an open position and configured to have a closed position. A speakerphone microphone is located in the first housing. A speakerphone speaker is located in the second housing wherein the speakerphone microphone is substantially distal the speakerphone speaker.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims. It is understood that the use of relational terms, if any, such as first and second, up and down, and the like are used solely to distinguish one from another entity or action without necessarily requiring or implying any actual such relationship or order between such entities or actions.

Figure 1:
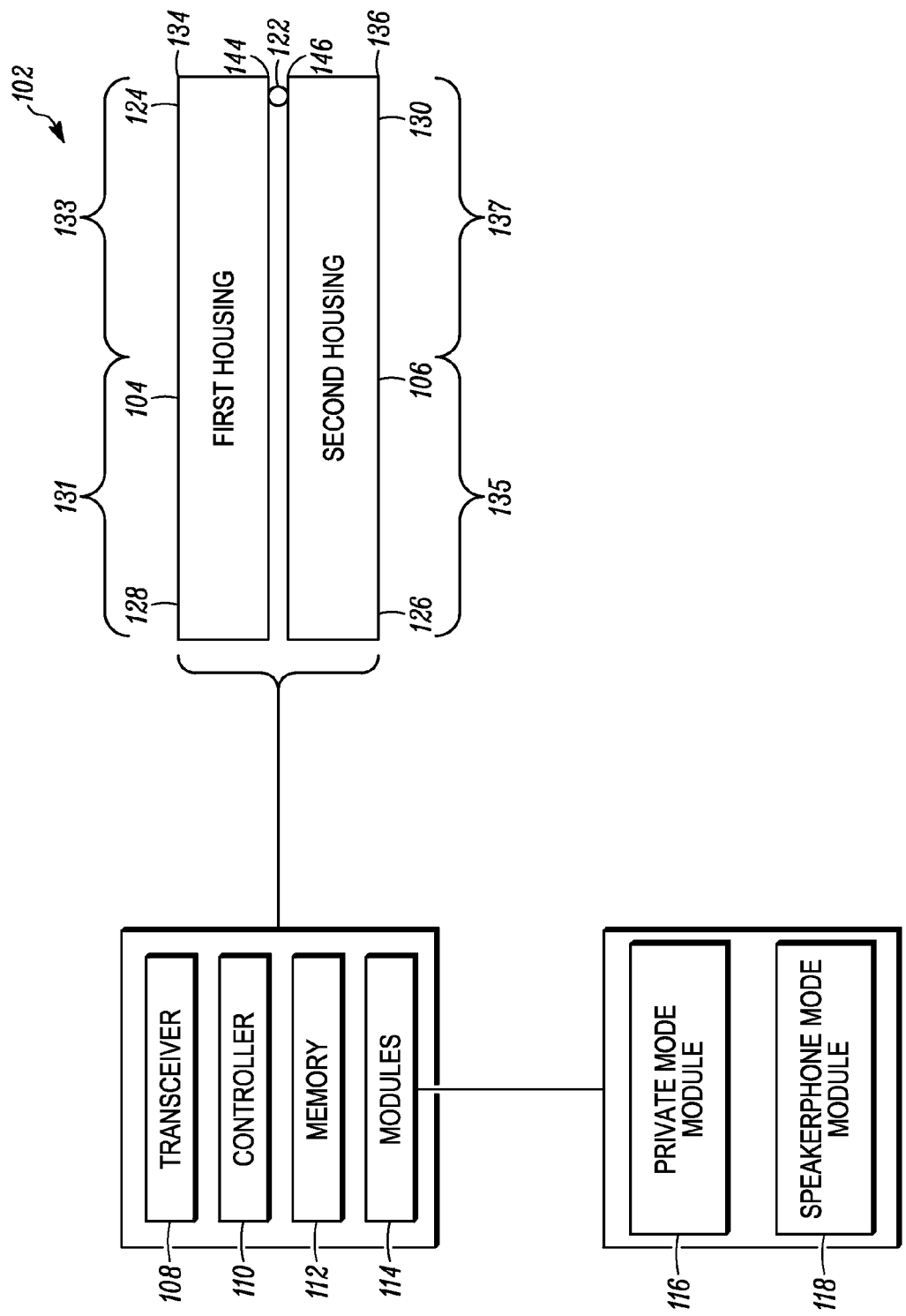
FIG. 1 depicts a mobile communication device having a first housing and a second housing proximally coupled to the first housing, the device configured to have an open position and configured to have a closed position.

FIG. 1 depicts a mobile communication device 102 having a first housing 104 and a second housing 106 that is proximally coupled to the first housing 104. The device 102 can be configured to have an open position and a closed position. The mobile communication device 102 may be implemented as a cellular telephone (also called mobile phones). The mobile communication device 102 represents a wide variety of devices that have been developed for use within various wireless and wired networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment.

In FIG. 1, the mobile communication device 102 is in a closed position. When in speakerphone mode, the device 102 may be in any position including an open position. A device in an open position is illustrated in FIGS. 3, 6, 9, and 10. The horizontal orientation of the device 102 depicts a position it may have when resting on a surface such a table when the device is a handsfree speakerphone mode. The identifications of the first housing 104 and the second housing 106 are chosen for convenience of description and are interchangeable.

The mobile communication device 102 can include for example a transceiver 108, a controller 110, memory 112 and modules 114. The modules may include for example, a private mode module 116 and a speakerphone mode module 118. The controller 110 can be configured to process speakerphone conversation mode instructions of speakerphone mode module 118. The modules can carry out certain processes of the methods executed by the controller as mentioned above. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation.

A speakerphone microphone may be located at any location on the first housing 104 and a speakerphone speaker may be located on the second housing 106 so that the speakerphone microphone is substantially distal the speakerphone speaker. As mentioned above, the housings are labeled first and second housings for convenience and are interchangeable. Accordingly, the speakerphone microphone and the speakerphone speaker may be isolated from one another as they are located on or within separate, albeit proximally coupled housings. The isolation of the speakerphone microphone and the speakerphone speaker can further include a distance component, wherein the speakerphone microphone is substantially distal the speakerphone speaker, example positions being illustrated in subsequent figures and discussed below.

Any type of coupling mechanism 122 can proximately couple the first housing 104 and the second housing 106. Examples of rotatable and translational coupling mechanisms are discussed below. The speakerphone microphone can be, for example at or near positions 124 or 126 while the speakerphone speaker can be at or near positions 128 and 130, respectively, so that they are on different housings and are substantially distal one another. In other embodiments, the speakerphone microphone can be at or near positions 128 or 130 while the speakerphone speaker can be at or near positions 124 and 126, respectively, so that they are on different housings and substantially distal one another. Positions 124, 126, 128 and 130 are on the exterior surfaces 134 and 136.

Bracketed portions 131 and 133 of exterior surface 134 represent possible positions of either a speakerphone microphone or a speakerphone speaker. Bracketed portions 135 and 137 represent possible positions of either a speakerphone microphone or a speakerphone speaker. Were a pair of speakerphone microphone and speaker located at opposite portions such as 131 and 137 or 133 and 135, they would be substantially distal one another.

In other embodiments, the speakerphone microphone and/or the speakerphone speaker may be positioned on interior surfaces 144 and 146 so that they are positioned on different housings and are substantially distal one another as described above with respect to the exterior surfaces. A speakerphone microphone located on an interior surface may not be acoustically distal the speakerphone speaker when the device is in the closed position. Moreover, the positions of the speakerphone microphone and the speakerphone speaker can be on a combination of exterior surfaces 134 and 136 and interior surfaces 144 and 146 so that they are positioned on different housings and are substantially distal one another. It is understood that while the positions of the speakerphone microphone and/or speakerphone speaker is referred to as on one or the other housing, the mechanical parts of the speakerphone microphone and/or speakerphone speaker can be in a housing. Moreover, while two housings are described, either of the housings 104 and 106 may be constructed by a combination of housing parts. It is understood that any housing construction is within the scope of this discussion.

While FIG. 1 is a length-wise view of the mobile communication device 102, it understood that the speakerphone microphone and the speakerphone speaker may be positioned at any suitable position along the width of the device 102, and that such position may not impact the proximity of the speakerphone microphone to the speakerphone speaker since they are substantially distal. A mobile communication device with other dimensions for practical or decorative reasons is within the scope of this discussion.

Figure 2:
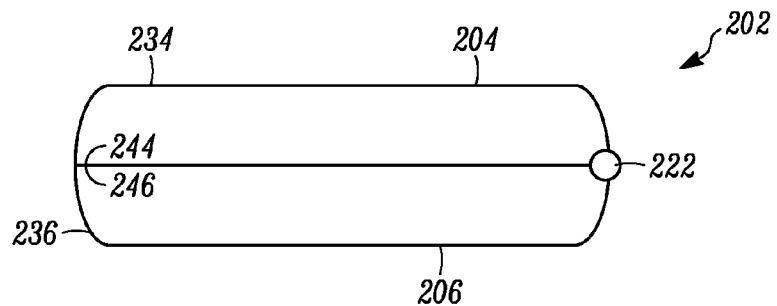
FIG. 2 depicts a mobile communication device having a clamshell form factor in the closed position.

FIG. 2 depicts a mobile communication device 202 having a clamshell form factor in the closed position. The clamshell form factor is an example of a device having proximally coupled first and second housings. The first housing 204 and the second housing 206 are rotationally coupled to one another so the device 202 is configured to have an open position and configured to have a closed position. A pivot 222 provides the coupling between first housing 204 and second housing 206. The first housing 204 can have exterior surface 234 and interior surface 244 in the closed position. The second housing 206 can have exterior surface 236 and interior surface 246 in the closed position.

Figure 3:
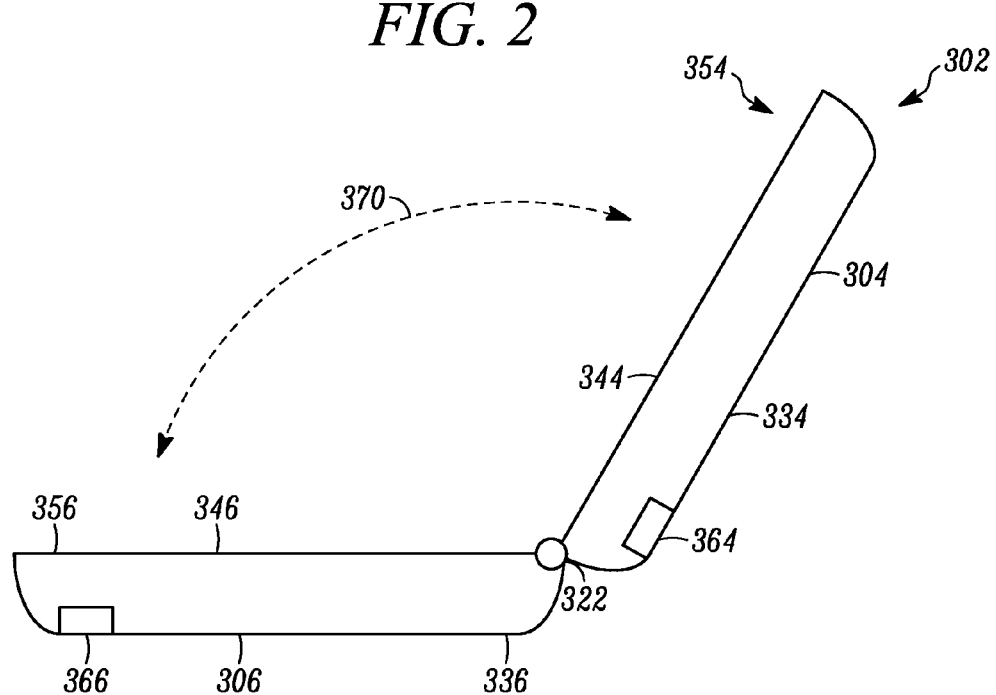
FIG. 3 depicts a mobile communication device having a clamshell form factor in the open position.

FIG. 3 depicts a mobile communication device 302 having a clamshell form factor in the open position. For the clamshell form factor, it is typical that private mode is carried out while the device 302 is in an open position. A private speaker is in a position 354 on interior surface 344 and a private microphone is in a position 356 on interior surface 346. In a private mode, the private mode module 116 (see FIG. 1) can provide instructions for the controller 110 so that the private microphone and the private speaker can process a private communication.

In this example embodiment, the speakerphone microphone 364 can be positioned on the exterior surface 334 and proximal the pivot 322. Moreover, the speakerphone speaker 366 can be positioned on the exterior surface 336 and distal the pivot 322. In this way, when the first housing 304 and the second housing 306 are rotatably coupled by for example a pivot 322, the speakerphone microphone 364 is substantially distal the speakerphone speaker 366 when the device is in the closed position. Arrow 370 indicates an opening and closing motion for the clamshell device 302.

Figure 4:
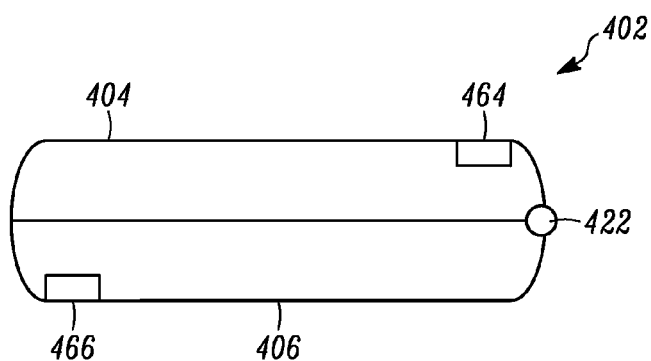
FIG. 4 depicts a mobile communication device having a clamshell form factor in a closed position.

FIG. 4 depicts a mobile communication device 402 having a clamshell form factor in a closed position. In this example, the first housing 404 and the second housing 406 are rotatably coupled, for example by a pivot 422. The speakerphone microphone 464 is substantially distal the speakerphone speaker 466 when the device 402 is in the closed position. As mentioned above, it is understood that there can be other arrangements of the speakerphone microphone and the speakerphone speaker so that they are on different housings and are substantially distal one another. In a speakerphone mode, the speakerphone mode module 118 (see FIG. 1) can provide instructions for the controller 110 so that the speakerphone microphone and the speakerphone speaker can process a speakerphone communication.

Figure 5:
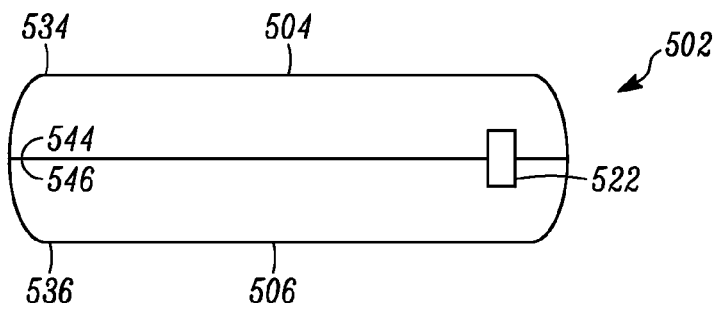
FIG. 5 depicts a mobile communication device having a rotator form factor in the closed position.

FIG. 5 depicts a mobile communication device 502 having a rotator form factor in the closed position. The rotator form factor is another example of a device having proximally coupled first and second housings. The first housing 504 and the second housing 506 are rotationally coupled to one another so the device 502 is configured to have an open position and configured to have a closed position. A pivot 522 provides the coupling between first housing 504 and second housing 506. The first housing 504 can have exterior surface 534 and interior surface 544 in the closed position. The second housing 506 can have exterior surface 536 and interior surface 546 in the closed position.

Figure 6:
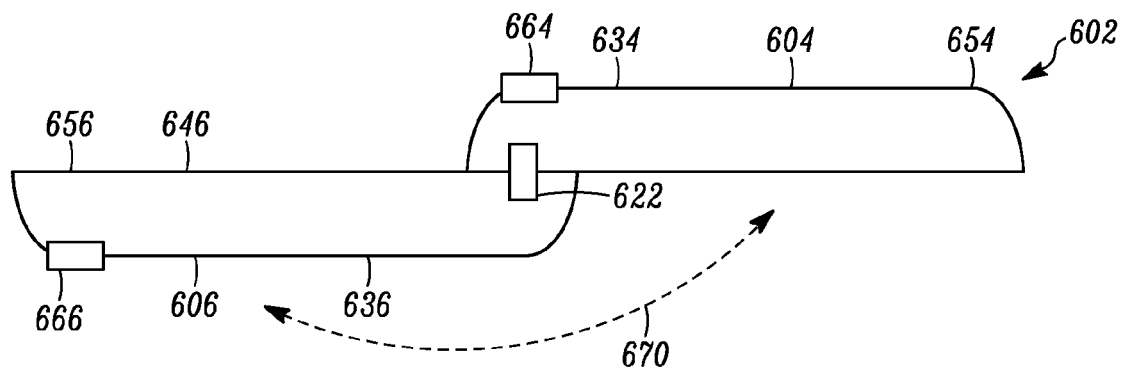
FIG. 6 depicts a mobile communication device having a rotator form factor in the open position.

FIG. 6 depicts a mobile communication device 602 having a rotator form factor in the open position. For the rotator form factor, it is typical that private mode is carried out while the device is in an open position. A private speaker is in a position 654 on exterior surface 634 and a private microphone is in a position 656 on interior surface 646. In this example embodiment, the speakerphone microphone 664 can be positioned on the exterior surface 634 and proximal the pivot 622. Moreover, the speakerphone speaker 666 can be positioned on the exterior surface 636 and distal the pivot 622. In this way, when the first housing 604 and the second housing 606 are rotatably coupled by for example a pivot 622, the speakerphone microphone 664 is substantially distal the speakerphone speaker 666 when the device is in the closed position. In another example embodiment, the speakerphone microphone 664 can be positioned on the exterior surface 634 and distal the pivot 622. The speakerphone speaker 666 can be positioned on the exterior surface 636 and proximal the pivot 622. In this way, when the first housing 604 and the second housing 606 are rotatably coupled by for example the pivot 622, the speakerphone microphone 664 is substantially distal the speakerphone speaker 666 when the device is in the closed position. Arrow 670 indicates an opening and closing motion for the rotator device 602.

Figure 7:
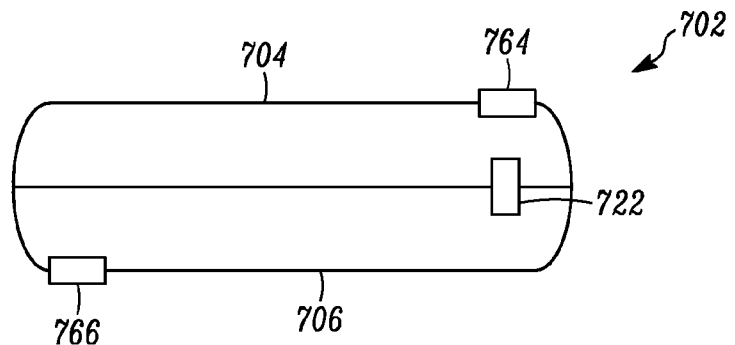
FIG. 7 depicts a mobile communication device having a rotator form factor in a closed position.

FIG. 7 depicts a mobile communication device 702 having a rotator form factor in a closed position. In this example, the first housing 704 and the second housing 706 are rotatably coupled, for example by a pivot 722. The speakerphone microphone 764 is substantially distal the speakerphone speaker 766 when the device 702 is in the closed position. As mentioned above, it is understood that there can be other arrangements of the speakerphone microphone and the speakerphone speaker so that they are on different housings and are substantially distal one another.

Figure 8:
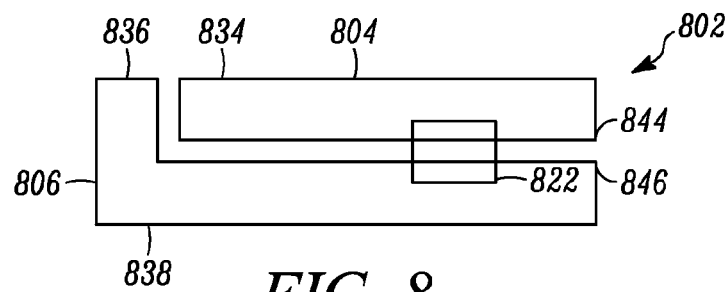
FIG. 8 depicts a mobile communication device having a slider form factor in the closed position.

FIG. 8 depicts a mobile communication device 802 having a slider form factor in the closed position. A slider form factor is another example of a device having proximally coupled first and second housings. The first housing 804 and the second housing 806 are translationally coupled to one another so the device 802 is configured to have an open position and configured to have a closed position. A slider mechanism 822 provides the coupling between first housing 804 and second housing 806. The first housing 804 can have exterior surface 834 and interior surface 844 in the closed position. The second housing 806 can have a first exterior surface 836, a second exterior surface 838 and interior surface 846 in the closed position.

Figure 9:
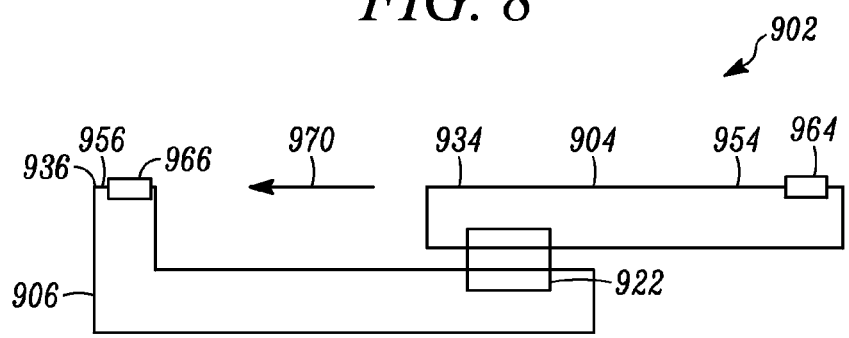
FIG. 9 depicts a mobile communication device having a slider form factor in the open position.

FIG. 9 depicts a mobile communication device 902 having a slider form factor in the open position. For the slider form factor, it is typical that the private mode is carried out while the device is in an open position. Private mode communication may also be available while the device is in a closed position as well. A private speaker is in a position 954 on the exterior surface 934 of the first housing 904 and a private microphone is in a position 956 on the first exterior surface 936 of the second housing 906. In this example embodiment, the speakerphone microphone 964 can be positioned on the exterior surface 934 of the first housing 904. Moreover, the speakerphone speaker 966 can be positioned on the first exterior surface 936. In this way, when the first housing 904 and the second housing 906 are translationally coupled by for example a slider mechanism 922, the speakerphone microphone 964 is substantially distal the speakerphone speaker 966 when the device is in the closed position. It is understood that the speakerphone microphone 964 is substantially distal the speakerphone speaker 966 when the device is in the open position, as well. Arrow 970 indicates an opening and closing motion for the slider phone device 902.

Figure 10:
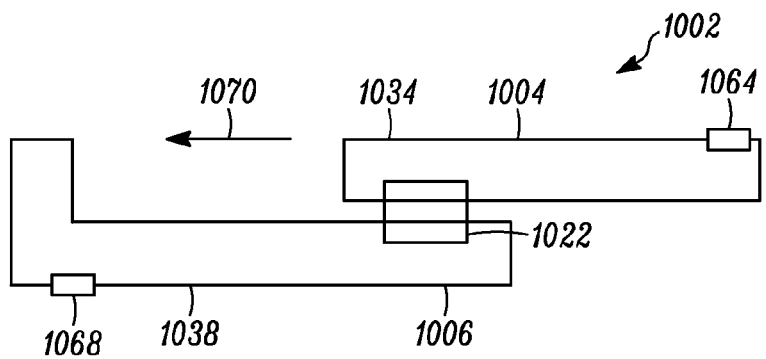
FIG. 10 depicts a mobile communication device having a slider form factor in the open position.

FIG. 10 depicts another embodiment of a mobile communication device 1002 having a slider form factor in the open position. The first housing 904 and the second housing 906 are translationally coupled by for example a slider mechanism 1022. In this example embodiment, the speakerphone microphone 1064 can be positioned on the exterior surface 1034 of the first housing 1004. Moreover, the speakerphone speaker 1068 can be positioned on the second exterior surface 1038 of the second housing 1006. Arrow 1070 indicates an opening and closing motion for the slider phone device 1002.

Figure 11:
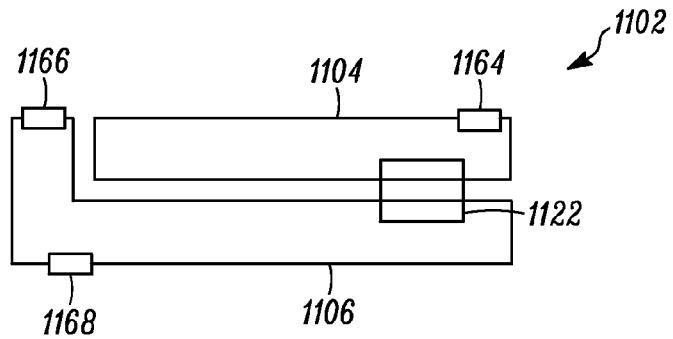
FIG. 11 depicts a mobile communication device having a slider form factor in a closed position and depicts two embodiments shown in FIGS. 9 and 10.

FIG. 11 depicts a mobile communication device 1102 in a closed position and depicts two embodiments shown in FIGS. 9 and 10. In this example, the first housing 1104 and the second housing 1106 are translationally coupled, for example by a slider mechanism 1122. The speakerphone microphone 1164 is substantially distal either or both the speakerphone speaker 1166 and speakerphone speaker 1168 when the device 1102 is in the closed position. As discussed above, it is understood that there can be other arrangements of the speakerphone microphone and the speakerphone speaker so that they are on different housings and are substantially distal one another.

Mechanical isolation between the speaker and the microphone to help avoid echo can be provided by the disclosed mobile communication device wherein the speakerphone microphone and the speakerphone speaker are housed in different housings and are substantially distal one another. Echo of full-duplex communication in handsfree mode may be substantially avoided in the above-described mobile communication devices. An echo reduction algorithm may further help avoid echo.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A mobile communication device having a first housing and a second housing proximally coupled to the first housing, the device configured to have an open position and configured to have a closed position, the device comprising:
   a private speaker located at a first interior surface of the first housing;
   a private microphone located at a second interior surface of the second housing;
   a controller configured to process a speakerphone conversation mode;
   a speakerphone microphone located at a first exterior surface of the first housing and coupled to the controller, the speakerphone microphone being configured for speakerphone conversation mode; and
   a speakerphone speaker located at a second exterior surface of the second housing and coupled to the controller, the speakerphone speaker being configured for speakerphone conversation mode,
   wherein the speakerphone microphone at the first exterior surface is substantially distal the private microphone at the second interior surface, and the speakerphone speaker at the second exterior surface is substantially distal the private speaker at the first interior surface.

2. The device of claim 1, wherein:
the first housing and the second housing that are rotatably coupled have a clamshell form factor;
the closed position defines an interior surface and an exterior surface of the first housing and an interior surface and an exterior surface of the second housing;
the speakerphone microphone is on the exterior surface of the first housing; and
the speakerphone speaker is on the exterior surface of the second housing.

3. The device of claim 1, wherein:
the first housing and the second housing that are rotatably coupled have a rotator telephone form factor;
the closed position defines an interior surface and an exterior surface of the first housing and an interior surface and an exterior surface of the second housing;
the speakerphone microphone is on the exterior surface of the first housing; and
the speakerphone speaker is on the exterior surface of the second housing.

4. The device of claim 1, wherein the first housing and the second housing are rotatably coupled and the first and second housings are coupled by a pivot, and the speakerphone microphone is proximal the pivot.

5. The device of claim 1, wherein the first housing and the second housing are rotatably coupled and the first and second housings are coupled by a pivot, and the speakerphone microphone is distal the pivot.

6. The device of claim 1 wherein the first housing and the second housing are rotatably coupled and the first and second housings are coupled by a pivot and the speakerphone speaker is distal the pivot.

7. The device of claim 1 wherein the first housing and the second housing are rotatably coupled and the first and second housings are coupled by a pivot and the speakerphone speaker is proximal the pivot.

8. The device of claim 1, wherein the first housing and the second housing are rotatably coupled and the speakerphone speaker is distal the speakerphone microphone when the device is in a closed position.

9. The device of claim 1, wherein the first housing and the second housing are rotatably coupled and the speakerphone speaker is distal the speakerphone microphone when the device is in an open position.

10. The device of claim 1, wherein:
the first housing and the second housing are translationally coupled and have a slider telephone form factor;
the closed position defines an exterior surface of the first housing and a first exterior surface and a second exterior surface of the second housing;
the speakerphone microphone is on the exterior surface of the first housing; and
the speakerphone speaker is on the first exterior surface of the second housing.

11. The device of claim 1, wherein:
the first housing and the second housing are translationally coupled and have a slider telephone form factor;
the closed position defines an exterior surface of the first housing and a first exterior surface and a second exterior surface of the second housing;
the speakerphone microphone is on the exterior surface of the first housing; and
the speakerphone speaker is on the second exterior surface of the second housing.

12. A mobile communication device comprising:
a first housing having a private speaker at a first interior surface and a speakerphone microphone at a first exterior surface;
a second housing proximally coupled to the first housing, the second housing being configured for an open position and a closed position, the second housing having a private microphone at a second interior surface and a speakerphone speaker at a second exterior surface;
wherein, at the open position, the speakerphone microphone at the first exterior surface is substantially distal the private microphone at the second interior surface, and the speakerphone speaker at the second exterior surface is substantially distal the private speaker at the first interior surface.

13. The mobile communication device of claim 12, wherein, at the closed position, the speakerphone microphone is closer the private microphone than its position at the open position, and the speakerphone speaker is closer the private speakerphone than its position at the open position.

14. The mobile communication device of claim 12, wherein the private speaker is substantially distal the private microphone and the speakerphone speaker is substantially distal the speakerphone microphone.

\* \* \* \* \*